United States Patent
Park (10) Patent No.: US 10,693,177 B2
(45) Date of Patent: Jun. 23, 2020

(54) LEAD FOR LITHIUM SECONDARY BATTERY HAVING EXCELLENT STABILITY AGAINST OVERCHARGE AND POUCH TYPE LITHIUM SECONDARY BATTERY COMPRISING THE SAME

(71) Applicant: LG CHEM, LTD., Seoul-si (KR)

(72) Inventor: Jong Pil Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 122 days.

(21) Appl. No.: 15/883,545

(22) Filed: Jan. 30, 2018

(65) Prior Publication Data

US 2018/0219246 A1 Aug. 2, 2018

(30) Foreign Application Priority Data

Feb. 2, 2017 (KR) .................. 10-2017-0015093

(51) Int. Cl.
*H01M 10/04* (2006.01)
*H01M 2/34* (2006.01)
(Continued)

(52) U.S. Cl.
CPC ....... *H01M 10/045* (2013.01); *H01M 2/0275* (2013.01); *H01M 2/34* (2013.01); *H01M 2/345* (2013.01); *H01M 10/049* (2013.01); *B60L 50/72* (2019.02); *H01M 2200/00* (2013.01); *H01M 2200/20* (2013.01)

(58) Field of Classification Search
None
See application file for complete search history.

(56) References Cited

U.S. PATENT DOCUMENTS

2013/0187495 A1 7/2013 Gehlert et al.

FOREIGN PATENT DOCUMENTS

| JP | 2011-249128 A | 12/2011 |
| KR | 10-2012-0139590 A | 12/2012 |

(Continued)

OTHER PUBLICATIONS

Cho et al. (KR 1020140139793 or KR 101601123) (a raw machine translation) (Abstract) (Year: 2014).*

(Continued)

*Primary Examiner* — Carmen V Lyles-Irving
(74) *Attorney, Agent, or Firm* — Morgan, Lewis & Bockius LLP (57) ABSTRACT

Disclosed herein are a short circuit formation unit for mechanically cutting an electrode tab and/or an electrode lead of a pouch-shaped battery cell in order to secure the safety of the pouch-shaped battery cell when the pouch-shaped battery cell swells due to gas generated in the pouch-shaped battery cell while the pouch-shaped battery cell is in an abnormal state or when the pouch-shaped battery cell is overcharged, and a pouch-shaped secondary battery including the same. Current is prevented from flowing in the pouch-shaped secondary battery when the pouch-shaped secondary battery is overcharged or when the pouch-shaped secondary battery is in an abnormal state. In addition, a reduction in the energy density of the pouch-shaped secondary battery is prevented when a voluminous device is further provided in the pouch-shaped secondary battery.

8 Claims, 6 Drawing Sheets

(51) Int. Cl.
*H01M 2/02* (2006.01)
*B60L 50/72* (2019.01)

(56) References Cited

FOREIGN PATENT DOCUMENTS

| KR | 10-2013-0076873 A | 7/2013 |
| KR | 10-2015-0074439 A | 7/2015 |
| KR | 10-1601123 B1 | 3/2016 |
| KR | 10-2016-0049889 A | 5/2016 |
| KR | 10-1614434 B1 | 5/2016 |
| KR | 10-2016-0129763 A | 11/2016 |

OTHER PUBLICATIONS

Cho et al. (KR 1020140139793 or KR 101601123) (a raw machine translation) (Detailed Description) (Year: 2014).*
Cho et al. (KR 1020140139793 or KR 101601123) (a raw machine translation) (Drawings) (Year: 2014).*

* cited by examiner

LEAD FOR LITHIUM SECONDARY BATTERY HAVING EXCELLENT STABILITY AGAINST OVERCHARGE AND POUCH TYPE LITHIUM SECONDARY BATTERY COMPRISING THE SAME

TECHNICAL FIELD

The present invention relates to a short circuit formation unit for securing the safety of a battery when the battery is overcharged and a pouch-shaped secondary battery including the same, and more particularly to a short circuit formation unit for mechanically cutting an electrode tab and/or an electrode lead of a pouch-shaped battery cell to secure the safety of the pouch-shaped battery cell when the pouch-shaped battery cell swells due to gas generated in the pouch-shaped battery cell while the pouch-shaped battery cell is in an abnormal state or when the pouch-shaped battery cell is overcharged, and to a pouch-shaped secondary battery including the same.

BACKGROUND ART

In general, there are various kinds of secondary batteries, such as a nickel cadmium battery, a nickel hydride battery, a lithium ion battery, and a lithium ion polymer battery. Such secondary batteries have been used in large-sized products that require high output, such as an electric vehicle and a hybrid electric vehicle, a power storage device for storing surplus power or new and renewable energy, and a backup power storage device. Secondary batteries also used in small-sized products, such as a digital camera, a portable digital versatile disc (DVD) player, an MP3 player, a personal digital assistant (PDP), a portable game device, a power tool, and an electric bicycle (E-bike).

A lithium secondary battery is charged and discharged through a process in which lithium ions from a lithium metal oxide of a positive electrode are repeatedly intercalated into a negative electrode, such as a graphite electrode, and the lithium ions are repeatedly deintercalated from the negative electrode.

Heat may be generated from such a lithium secondary battery due to a short circuit by external impacts, the overcharge or the overdischarge of the lithium secondary battery. As a result, an electrolyte may be decomposed into gas in the lithium secondary battery, and thermal runaway could occur in the lithium secondary battery. These are several aspects for safety of the lithium secondary battery. In particular, the secondary battery may explode for various reasons. In one example, the secondary battery may explode due to an increase in the pressure of air in the secondary battery, which is caused by the decomposition of an electrolyte. Specifically, when the secondary battery is repeatedly charged and discharged, gas may be generated in the secondary battery as the result of the electrochemical reaction between the electrolyte and an electrode active material. The gas generated in the secondary battery increases the pressure in the secondary battery. As a result, the fastening force between parts constituting the secondary battery may be reduced, the external case of the secondary battery may be damaged, a protection circuit of the secondary battery may be operated early, an electrode of the secondary battery may be deformed, a short circuit may occur in the secondary battery, or the secondary battery may explode.

In order to secure the safety of such a battery when the battery is overcharged, overcurrent is prevented from flowing in the battery through the control of electronic parts, whereby the battery is prevented from being overcharged. To this end, a protection circuit, such as a protection circuit module (PCM), may be applied to the battery. Even in the case in which such an overcharge protection circuit, such as a PCM, is applied to the battery, however, it is difficult to sufficiently secure the safety of the battery. In particular, it is necessary for a pouch-shaped battery to be provided with a further improved protection circuit structure in order to more accurately check the swelling of the pouch-shaped battery.

In addition, there has been used a mechanical current interrupt device that physically interrupts the series connection of a battery pack using the pressure generated in the battery due to thermal expansion of the battery when the battery is overcharged in consideration of malfunction of the electronic parts of the battery. Generally, in the current interrupt device of the battery pack, there is widely used a method of physically cutting the series connection of the battery pack through the structure of the battery pack using only the pressure generated in the battery as the battery is expanded when the battery is overcharged in order to interrupt the flow of current in the battery pack. However, a short circuit formation unit that is capable of interrupting the flow of current in a pouch-shaped battery when the volume of the pouch-shaped battery is increased has not been suggested.

Korean Patent Application Publication No. 2016-0129763 (Nov. 9, 2016) discloses a lithium secondary battery including a positive electrode plate, a separator, and a negative electrode plate, which are sequentially stacked, an electrode tab extending from one side of each of the positive electrode plate and the negative electrode plate by a predetermined length, and an electrode lead electrically connected to the electrode tab, wherein a welded portion is provided at at least a portion of a region between the electrode tab and the electrode lead under a normal operating condition of the lithium secondary battery and wherein the welded portion is cut under an abnormal operating condition of the lithium secondary battery, for example when the temperature of the lithium secondary battery is high. However, any unit corresponding to a short circuit formation unit for separating two-level concave and convex electrode leads, connected to each other via a conductive adhesive, from each other when the volume of a pouch-shaped battery case is increased is not suggested.

Korean Registered Patent No. 10-1601123 (Mar. 8, 2016) discloses a secondary battery including an electrode assembly and a battery case, in which the electrode assembly is provided in a sealed state such that the electrode assembly is isolated from the outside, wherein the secondary battery further includes a first electrode lead, having one end connected to the electrode assembly so as to protrude from the electrode assembly and the other end exposed outward from the battery case, and a second electrode lead, detachably connected to the first electrode lead, the second electrode lead extending from the inside of the battery case to the outside of the battery case so as to be exposed outward from the battery case, and wherein an adhesive portion for coupling the first electrode lead and the second electrode lead is provided outside the battery case. However, any unit corresponding to a short circuit formation unit for cutting an electrode tab and an electrode lead when the volume of a pouch-shaped battery case is increased is not suggested.

Korean Registered Patent No. 10-1614434 (May 2, 2016) discloses a battery cell having an overcurrent interrupt function, the battery cell including an electrode assembly, an electrode lead connected to the electrode assembly, the electrode lead including a first metal plate and a second metal plate located so as to be spaced apart from each other by a predetermined gap and an alloy bridge for filling the gap between the first metal plate and the second metal plate, the alloy bridge having a melting point lower than the melting points of the first metal plate and the second metal plate, a cell case for receiving the electrode assembly such that the electrode lead is exposed outward, and a CTR terminal connected between opposite ends of the battery cell for causing a short circuit outside the battery cell when the temperature of the battery cell exceeds a predetermined temperature, wherein the alloy bridge exhibits electrical resistance higher than the electrical resistances of the first metal plate and the second metal plate, and wherein the alloy bridge is located outside the cell case. However, any unit corresponding to a short circuit formation unit for separating two-level electrode leads, connected to each other via a conductive adhesive, from each other when the volume of a pouch-shaped battery case is increased is not suggested.

Korean Patent Application Publication No. 2012-0139590 (Dec. 27, 2012) discloses a part for secondary batteries including a lead-free soldering bridge having a melting point of 150 to 300° C., the lead-free soldering bridge being mainly made of tin (Sn) and copper (Cu), and a first metal plate and a second metal plate joined to the lead-free soldering bridge in the state of being spaced apart from each other by a small gap. However, any unit corresponding to a short circuit formation unit for separating two-level electrode leads, connected to each other via a conductive adhesive, from each other when the volume of a pouch-shaped battery case is increased is not suggested.

Japanese Patent Application Publication No. 2011-249128 (Dec. 8, 2011) discloses a temperature fuse including a pair of lead conductors opposite each other in the state of being spaced apart from each other in a longitudinal direction, a pair of notches formed in opposite ends of the lead conductors so as to face outward in the longitudinal direction, and a joint for joining the lead conductors by welding the opposite ends of the lead conductors using a low melting-point soluble alloy, wherein the size of each of the notches in the longitudinal direction is set to be equal to or greater than the size of the joint in the longitudinal direction. However, any unit corresponding to a short circuit formation unit for separating two-level concave and convex electrode leads, connected to each other via a conductive adhesive, from each other when the volume of a pouch-shaped battery case is increased is not suggested.

Korean Patent Application Publication No. 2015-0074439 (Jul. 2, 2015) discloses a battery overcharge safety device including a battery stack constituted by a plurality of cells, a safety circuit electrically connected to two or more cells of the battery stack, the safety circuit having an interrupting means for selectively interrupting the electrical connection of the cells, and a closed circuit provided between the cells connected to the safety circuit, the closed circuit having a switching means for selectively switching the electrical connection of the cells when the cells swell, wherein the switching means is pushed and turned ON to open the interrupting means of the safety circuit and the electrical conduction between the cells is achieved through the switching means when the cells swell, and wherein the switching means is turned OFF and the electrical conduction between the cells is interrupted when the cells swell further. However, any unit corresponding to a short circuit formation unit for separating two-level concave and convex electrode leads, connected to each other via a conductive adhesive, from each other when the volume of a pouch-shaped battery case is increased is not suggested.

That is, a short circuit formation unit for short-circuiting a pouch-shaped secondary battery when the pressure in the battery increases or when the volume of the battery increases in an abnormal state of the battery, for example in the case in which the battery is overcharged or in the case in which gas is generated in the battery, in order to secure the safety of a pouch-shaped battery and a pouch-shaped secondary battery including the same have not been suggested.

RELATED ART DOCUMENT

[Patent Document 0001]
 Korean Patent Application Publication No. 2016-0129763 (Nov. 11, 2016)
[Patent Document 0002]
 Korean Registered Patent No. 10-1601123 (Mar. 8, 2016)
[Patent Document 0003]
 Korean Registered Patent No. 10-1614434 (May 2, 2016)
[Patent Document 0004]
 Korean Patent Application Publication No. 2012-0139590 (Dec. 27, 2012)
[Patent Document 0005]
 Japanese Patent Application Publication No. 2011-249128 (Dec. 8, 2012)
[Patent Document 0006]
 Korean Patent Application Publication No. 2015-0074439 (Jul. 2, 2015)

DISCLOSURE

Technical Problem

The present invention has been made in view of the above problems, and it is an object of the present invention to provide a short circuit formation unit for mechanically cutting an electrode tab and/or an electrode lead of a pouch-shaped battery cell in order to secure the safety of the pouch-shaped battery cell when the pouch-shaped battery cell swells due to gas generated in the pouch-shaped battery cell while the pouch-shaped battery cell is in an abnormal state or when the pouch-shaped battery cell is overcharged, and a pouch-shaped secondary battery including the same.

It is another object of the present invention to provide a simple short circuit formation unit that can be used instead of an additional device for interrupting the flow of current in a battery cell in an abnormal state of the battery cell, thereby maintaining the energy density of the battery cell, and a pouch-shaped secondary battery including the same.

Technical Solution

In accordance with one aspect of the present invention, the above and other objects can be accomplished by the provision of a pouch-shaped secondary battery configured to have a structure in which a unit cell, including a positive electrode plate, a separator, a negative electrode plate, an electrode tab, and an electrode lead, or a cell assembly, constituted by two or more stacked unit cells, is contained in a pouch-shaped battery case, wherein the pouch-shaped secondary battery includes a short circuit formation unit for separating two or more units of the electrode tab and/or the electrode lead from each other when the pouch-shaped battery case is deformed due to an increase in the volume of the pouch-shaped battery case.

In addition, the short circuit formation unit may be configured to separate the two or more units of the electrode tab and/or the electrode lead from each other through the division of the short circuit formation unit when the pouch-shaped battery case is deformed due to an increase in the volume of the pouch-shaped battery case.

In addition, the short circuit formation unit may be formed at at least one selected from among the electrode tab, the electrode lead, and a connection between the electrode tab and the electrode lead.

In addition, the electrode tab may be a positive electrode tab, a negative electrode tab, or both the positive electrode tab and the negative electrode tab.

In addition, the electrode lead may be a positive electrode lead, a negative electrode lead, or both the positive electrode lead and the negative electrode lead.

In addition, the short circuit formation unit may include a concave unit and a convex unit, the concave unit and the convex unit being coupled to each other.

In addition, an adhesive layer may be further provided between the concave unit and the convex unit of the short circuit formation unit.

In addition, one surface of at least one selected from among the electrode tab, the electrode lead, and the connection between the electrode tab and the electrode lead may be disposed so as to be in contact with the pouch-shaped battery case.

In addition, the adhesive layer may be a conductive adhesive layer.

In addition, the adhesive layer may include metal particles made of gold, silver, copper, nickel, aluminum, or an alloy thereof, or may include particles, the surface of each of which is coated with a metal material, such as gold, silver, copper, nickel, aluminum, or an alloy thereof. In addition, each of the concave unit and the convex unit of the short circuit formation unit may be formed so as to have at least one selected from among a quadrangular section, a circular section, a semicircular section, a diamond-shaped section, an oblique section, a wave section, a zigzag section, a sawtooth section, and an arbitrarily shaped section.

In addition, an increase in the volume ($V_{short}$) of the pouch-shaped battery case for cutting the electrode tab and/or the electrode lead may satisfy the condition of $V_{short} > L$ on the assumption that the length of one side surface of the short circuit formation unit is L.

In addition, an increase in the volume ($V_{short}$) of the pouch-shaped battery case for cutting the electrode tab and/or the electrode lead may satisfy the condition of $V_{short} > Tc$ on the assumption that the length of a first short circuit formation unit adhesive layer and/or a second short circuit formation unit adhesive layer of the short circuit formation unit is Tc.

In accordance with another aspect of the present invention, there is provided a device including the pouch-shaped secondary battery described above.

In addition, the device may be selected from the group consisting of an electronic device, an electric vehicle, a hybrid electric vehicle, and a power storage device.

Advantageous Effects

As is apparent from the above description, a short circuit formation unit for securing the safety of a battery when the battery is overcharged and a pouch-shaped secondary battery including the same according to the present invention have the effect of preventing current from flowing in the pouch-shaped secondary battery when the pouch-shaped secondary battery is overcharged or in the state in which the pouch-shaped secondary battery is in an abnormal state.

In addition, the present invention has the effect of preventing a reduction in the energy density of the pouch-shaped secondary battery when a voluminous device is further provided in the pouch-shaped secondary battery.

In addition, the present invention has the effect of cutting an electrode tab and/or an electrode lead when the volume of the pouch-shaped secondary battery increases due to gas generated in the pouch-shaped secondary battery.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to the same or like parts. Meanwhile, in the case in which one part is 'connected' to another part in the following description of the present invention, not only may the one part be 'directly connected' to the another part, but also, the one part may be 'indirectly connected' to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

Figure 1:
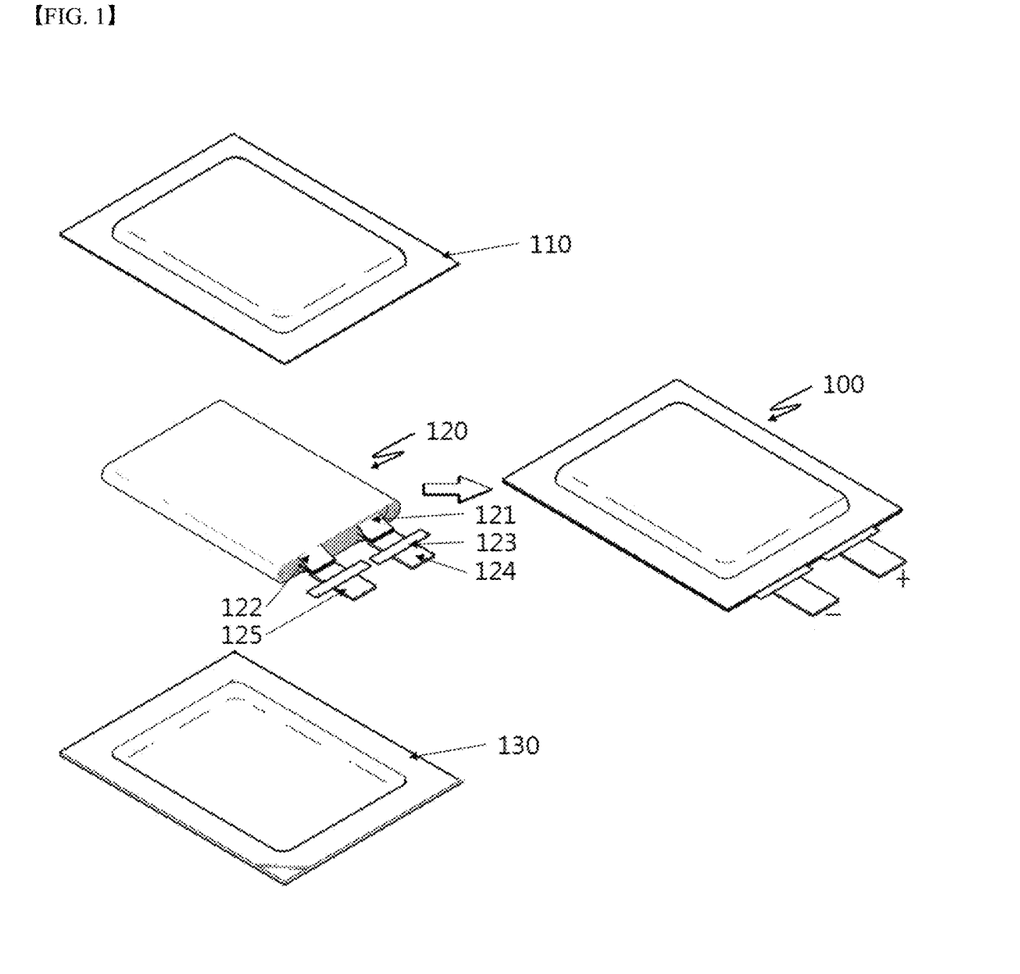
FIG. 1 is a view showing an illustrative conventional pouch-shaped battery cell.

FIG. 1 is a view showing an illustrative conventional pouch-shaped battery cell.

In generally, a lithium secondary battery 100 is manufactured as follows. First, a mixture of an active material, a binder, and a plasticizer is applied to a positive electrode current collector and a negative electrode current collector in order to manufacture a positive electrode plate and a negative electrode plate, respectively. Subsequently, a plurality of positive electrode plates and a plurality of negative electrode plates are stacked in the state in which separators are interposed respectively between the positive electrode plates and the negative electrode plates in order to manufacture a battery cell 120 having a predetermined shape. Subsequently, the battery cell 120 is placed in a battery case 110, 130, an electrolytic solution is injected into the battery case 110, 130, and the battery case 110, 130 is sealed, whereby a secondary battery 100, such as a battery pack, is manufactured.

Electrode leads 124, 125 are connected to a general electrode assembly. Each of the electrode leads 124, 125 is configured to have a structure in which one end of the electrode lead 124, 125 is connected to the electrode assembly, the other end of the electrode lead 124, 125 is exposed outward from the battery case 110, 130, and the battery case 110, 130, in which the electrode assembly is placed, is sealed by an adhesive layer 123, such as a sealant layer, at the portion of the battery case 110, 130 from which the electrode lead 124, 125 extends outward from the battery case 110, 130.

In addition, the electrode assembly is provided with electrode tabs 121, 122. Each current collector plate of the electrode assembly includes a coated part, on which an electrode active material is coated, and an end part (hereinafter, referred to as a "non-coated part"), on which the electrode active material is not coated. Each of the electrode tabs 121, 122 may be formed by cutting the non-coated part, or may be a separate conductive member connected to the non-coated part by ultrasonic welding. As shown, the electrode tabs 121, 122 may protrude in one direction such that the electrode tabs 121, 122 are formed at the electrode assembly so as to be arranged side by side. Alternatively, the electrode tabs 121, 122 may protrude in opposite directions.

Each electrode tab 121, 122 serves as a path along which electrons move between the inside and the outside of the battery. Each of the electrode leads 124, 125 is connected to a corresponding one of the electrode tabs 121, 122 by spot welding. The electrode leads 124, 125 may extend in the same direction or in opposite direction depending on the position at which positive electrode tabs and negative electrode tabs are formed. A positive electrode lead and a negative electrode lead may be made of different materials. For example, the positive electrode lead may be made of the same material as the positive electrode plate, such as an aluminum (Al) material, and the negative electrode lead may be made of the same material as the negative electrode plate, such as a copper (Cu) material or a copper material coated with nickel (Ni). Finally, the electrode leads 124, 125 are electrically connected to external terminals via terminal parts thereof.

A pouch-shaped sheathing member contains the electrode assembly in a sealed state such that a portion of each of the electrode leads 124, 125, i.e. the terminal part of each of the electrode leads 124, 125, is exposed from the pouch-shaped sheathing member. As previously described, the adhesive layer 123, such as a sealant layer, is interposed between each of the electrode leads 124, 125 and the pouch-shaped sheathing member. The pouch-shaped sheathing member is provided at the edge thereof with a sealed region. A horizontal slit of each of the electrode leads 124, 125 is spaced apart from the sealed region toward a joint. That is, in the case in which each of the electrode leads 124, 125 is formed so as to have an inverted T shape, the leg part of the T shape protrudes outward from the pouch-shaped sheathing member whereas a portion of the head part of the T shape is located in the sealed region.

In general, a positive electrode current collector plate is made of an aluminum material, and a negative electrode current collector plate is made of a copper material. When a swelling phenomenon occurs, copper foil tends to rupture more easily than aluminum foil. For this reason, the negative electrode lead may rupture more easily than the positive electrode lead. Preferably, therefore, the negative electrode lead is used as an electrode lead that is capable of rupturing.

In the normal state of the secondary battery 100, the electrode assembly is isolated from the outside due to the adhesive layer 123. When the pressure in the battery 100 increases as the result of the overcharge of the battery 100 or an increase in the temperature of the battery 100, however, the battery case 110, 130 may swell. At this time, the weak portion of the battery case 110, 130 or the adhesion portion between another component of the secondary battery 100 and the battery case 110, 130 ruptures, whereby gas is discharged from the battery.

As long as the electrode leads 124, 125 are electrically connected to the electrode assembly, however, current continuously flows in the battery 100, making it very difficult to secure the safety of the battery 100. In order to solve this problem, the amount of electrolyte that is injected into the secondary battery 100 may be adjusted, or the short circuit pressure of a current interrupt device (CID) may be adjusted. In this case, however, the safety of the battery is reduced when the battery is overcharged. That is, it is difficult not only to secure the safety of the battery when the battery is overcharged but also to secure the battery when the battery is used in a high-temperature situation.

COMPARATIVE EXAMPLE

Figure 2:
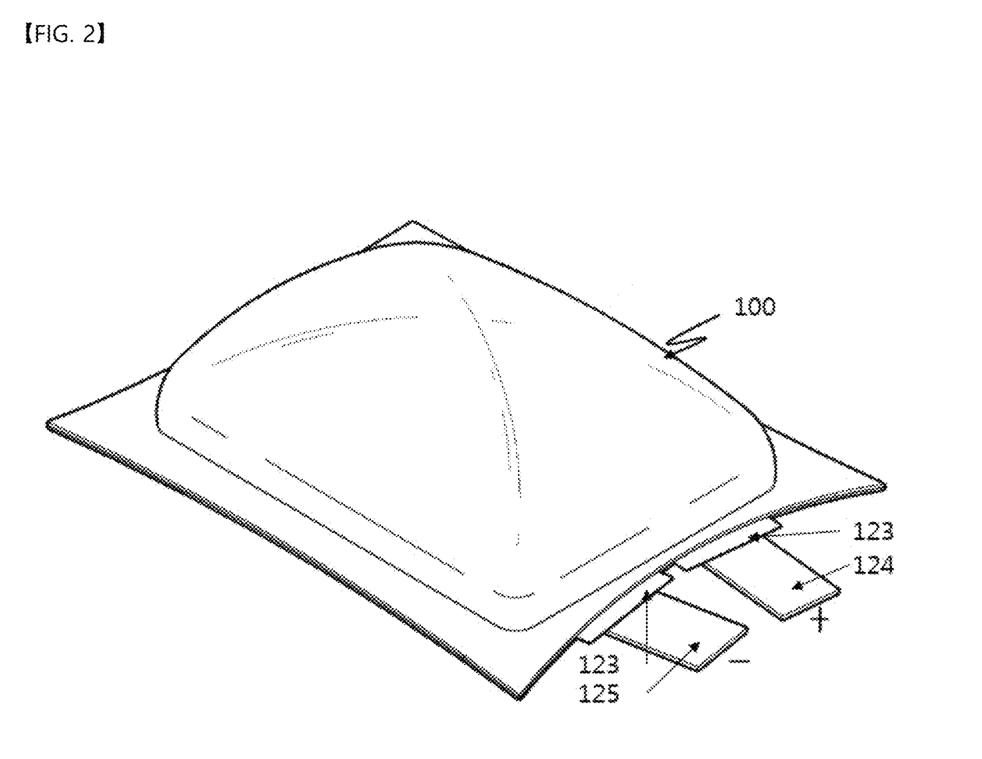
FIG. 2 is a view showing an increase in the volume of the illustrative conventional pouch-shaped battery cell due to gas generated in the battery cell.

FIG. 2 is a view showing an increase in the volume of the illustrative conventional pouch-shaped battery cell due to gas generated in the battery cell.

A pouch-shaped battery case 110, 130 includes a gas barrier layer and a sealant layer. The pouch-shaped battery case may further include a surface protective layer, which is the outermost layer formed on the gas barrier layer. The gas barrier layer is configured to prevent the introduction of gas into the battery cell. The gas barrier layer is mainly made of aluminum (Al) foil. The sealant layer is the innermost layer of the pouch-shaped battery case 110, 130, which contacts the member placed in the pouch-shaped battery case 110, 130, i.e. the battery cell. The surface protective layer is mainly made of nylon resin in consideration of wear resistance and heat resistance. The pouch-shaped battery case 110, 130 is manufactured by processing a film having the above stack structure into the shape of a pouch. Components constituting the battery cell, such as positive electrodes, negative electrodes, and separators, are placed in the pouch-shaped battery case 110, 130 in the state of being impregnated with an electrolytic solution. After the components constituting the battery cell are placed in the pouch-shaped battery case 110, 130, the sealant layers are sealed by thermal bonding at the entrance of the pouch-shaped battery case 110, 130. Since each of the sealant layers contacts the components constituting the battery cell, it is necessary for each of the sealant layers to exhibit high insulation and high resistance to the electrolytic solution. In addition, is necessary for each of the sealant layers to exhibit high sealability to such an extent that the pouch-shaped battery case 110, 130 can be isolated from the outside. That is, it is necessary for the sealing portion of the pouch-shaped battery case 110, 130 at which the sealant layers are sealed by thermal bonding to exhibit high thermal adhesive strength. In general, a sealant layer is made of a polyolefin-based resin, such as polypropylene (PP) or polyethylene (PE). In particular, each of the sealant layers of the pouch-shaped battery case 110, 130 is mainly made of polypropylene (PP), since polypropylene exhibits excellent mechanical properties, such as high tensile strength, high rigidity, high surface hardness, and high impact resistance, and high resistance to an electrolytic solution.

However, the conventional pouch-shaped secondary battery 100 is unsafe from the aspect of explosion danger. In general, heat and pressure are generated in a battery cell while electricity is produced/used (i.e. charged/discharged) in the battery cell (i.e. while an oxidation-reduction reaction occurs in the battery cell). At this time, high heat and pressure may be generated in the battery cell due to the overcharge of the battery cell or the short circuit in the battery cell, which may be caused by an abnormal reaction in the battery cell. The battery cell may explode due to such high heat and pressure. The conventional pouch-shaped secondary battery 100 is not provided with any mechanical means that is capable of preventing the explosion of the secondary battery 100. As a result, the conventional pouch-shaped secondary battery is exposed to explosion danger.

Embodiment

Figure 3:
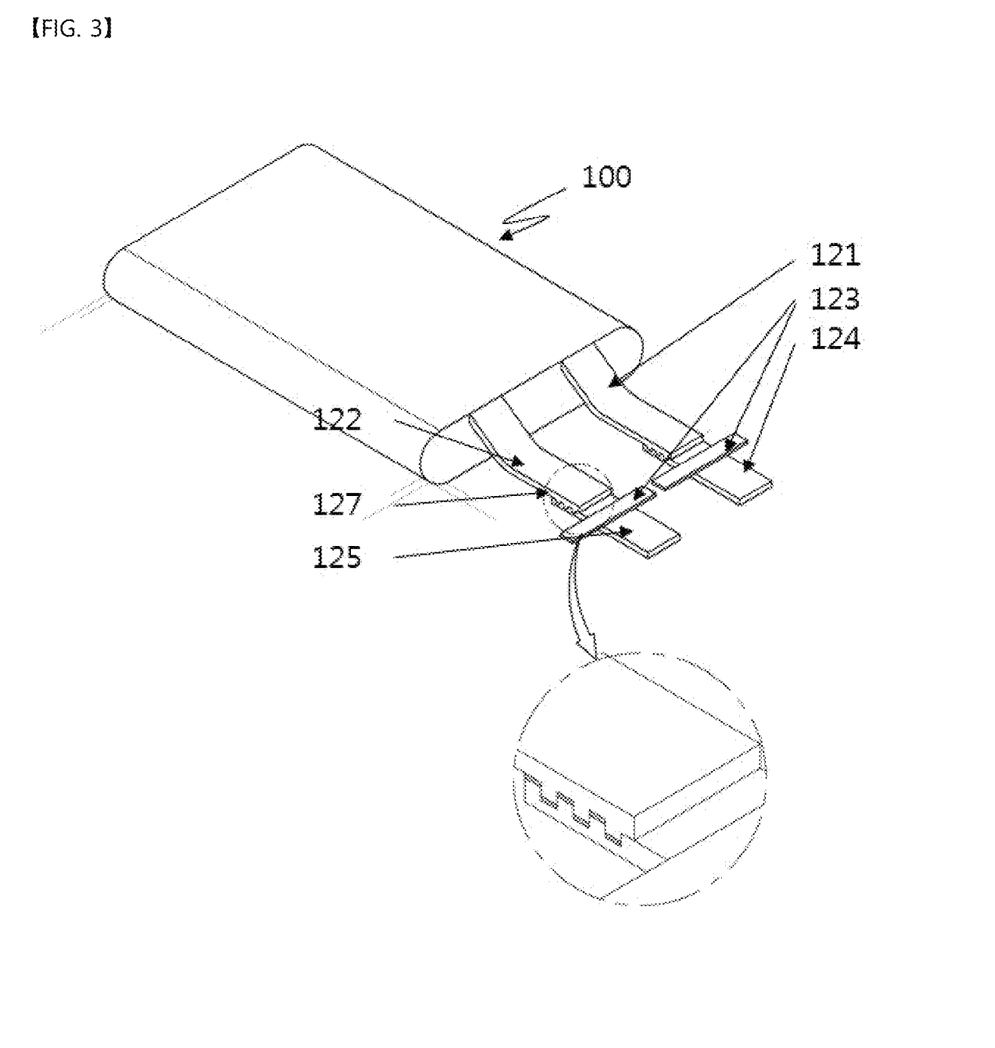
FIG. 3 is a view showing a pouch-shaped secondary battery having a short circuit formation unit according to an embodiment of the present invention.

FIG. 3 is a view showing a pouch-shaped secondary battery 100 having a short circuit formation unit 127 according to an embodiment of the present invention.

The present invention provides a pouch-shaped secondary battery 100 configured to have a structure in which a unit cell, including a positive electrode plate, a separator, a negative electrode plate, an electrode tab, and an electrode lead, or a cell assembly, constituted by two or more stacked unit cells, is contained in a pouch-shaped battery case 110, 130, wherein the pouch-shaped secondary battery 100 includes a short circuit formation unit 127 for separating two or more units of the electrode tab 121, 122 and/or the electrode lead 124, 125 from each other when the pouch-shaped battery case 110, 130 is deformed due to an increase in the volume of the pouch-shaped battery case 110, 130.

The unit cell is a single cell.

The pouch-shaped secondary battery 100 may further include an insulation tape 123. The insulation tape 123 is attached to a predetermined portion of the pouch-shaped battery case 110, 130 at which the electrode tab 121, 122 contacts the pouch-shaped battery case 110, 130 in order to seal the pouch-shaped battery case 110, 130 while insulating the electrode tab 121, 122 from the pouch-shaped battery case 110, 130. When the pouch-shaped battery case 110, 130 is sealed, the pressure at the portion of the pouch-shaped battery case 110, 130 at which the electrode tab 121, 122 contacts the pouch-shaped battery case 110, 130 is relatively high. As a result, a casted polypropylene (CPP) layer of the pouch-shaped battery case 110, 130 may be easily damaged. Consequently, an inner layer of the insulation tape 123 exhibits high mechanical strength and high heat resistance such that the shape of the insulation tape 123 can be maintained, and thus electrical insulation between the pouch-shaped battery case 110, 130 and the electrode tab 121, 122 can be maintained when the pouch-shaped battery case 110, 130 is sealed by fusion in the state in which heat and pressure are applied to the pouch-shaped battery case 110, 130. In particular, the inner layer of the insulation tape 123 prevents aluminum foil of the pouch-shaped battery case 110, 130 from electrically contacting the electrode tab 121, 122 even when a portion of the aluminum foil of the pouch-shaped battery case 110, 130 is exposed during the sealing of the pouch-shaped battery case 110, 130, whereby it is possible to maintain the insulated state of the pouch-shaped battery case 110, 130. An outer layer of the insulation tape 123 provides high adhesive force between the pouch-shaped battery case 110, 130 and the electrode tab 121, 122 even when a portion of the insulation tape 123 is deformed in the state in which heat and pressure are applied to the pouch-shaped battery case 110, 130, whereby it is possible to maintain the sealed state of the pouch-shaped battery case 110, 130. Therefore, even when the casted polypropylene (CPP) layer of the pouch-shaped battery case 110, 130 is deformed due to heat and pressure during the sealing of the pouch-shaped battery case 110, 130, whereby a portion of the aluminum foil of the pouch-shaped battery case 110, 130 is exposed, it is possible to maintain the insulated state of the pouch-shaped battery case 110, 130.

Consequently, it is not necessary for the pouch-shaped secondary battery 100, which is provided with the short circuit formation unit 127, to have a current interrupt device (CID), which is required of a can-shaped secondary battery 100.

In addition, the short circuit formation unit 127 may be configured to separate the two or more units of the electrode tab 121, 122 and/or the electrode lead 124, 125 from each other through division of the short circuit formation unit 127 when the pouch-shaped battery case 110, 130 is deformed due to an increase in the volume of the pouch-shaped battery case 110, 130.

It is obvious that the coupling form of the parts of the short circuit formation unit 127 and the number of parts constituting the short circuit formation unit 127 are not particularly restricted, as long as the short circuit formation unit 127 is capable of cutting the electrode tab 121, 122 and/or the electrode lead 124, 125.

In addition, the short circuit formation unit 127 may be formed at the two or more units of the electrode tab 121,122 and/or the electrode lead 124, 125.

The material of the short circuit formation unit is not particularly restricted, as long as the short circuit formation unit is capable of cutting the electrode tab and/or the electrode lead. For example, the short circuit formation unit may be made of at least one selected from among a polymer resin, an inorganic material, and a metal material.

In addition, the short circuit formation unit may be formed at at least one selected from among the electrode tab, the electrode lead, and the connection between the electrode tab and the electrode lead.

In order to prevent current from flowing in the pouch-shaped secondary battery by short circuiting the battery when the battery is overcharged or when the battery is in an abnormal state, the short circuit formation unit may be formed at at least one selected from among the electrode tab, the electrode lead, and the connection between the electrode tab and the electrode lead. Preferably, the short circuit formation unit is formed at the electrode lead. The short circuit formation unit physically cut at least one selected from among the electrode tab, the electrode lead, and the connection between the electrode tab and the electrode lead when the pouch-shaped battery case is abnormally expanded. Consequently, a plurality of short circuit formation units may be provided in order to achieve the above purpose.

Figure 4:
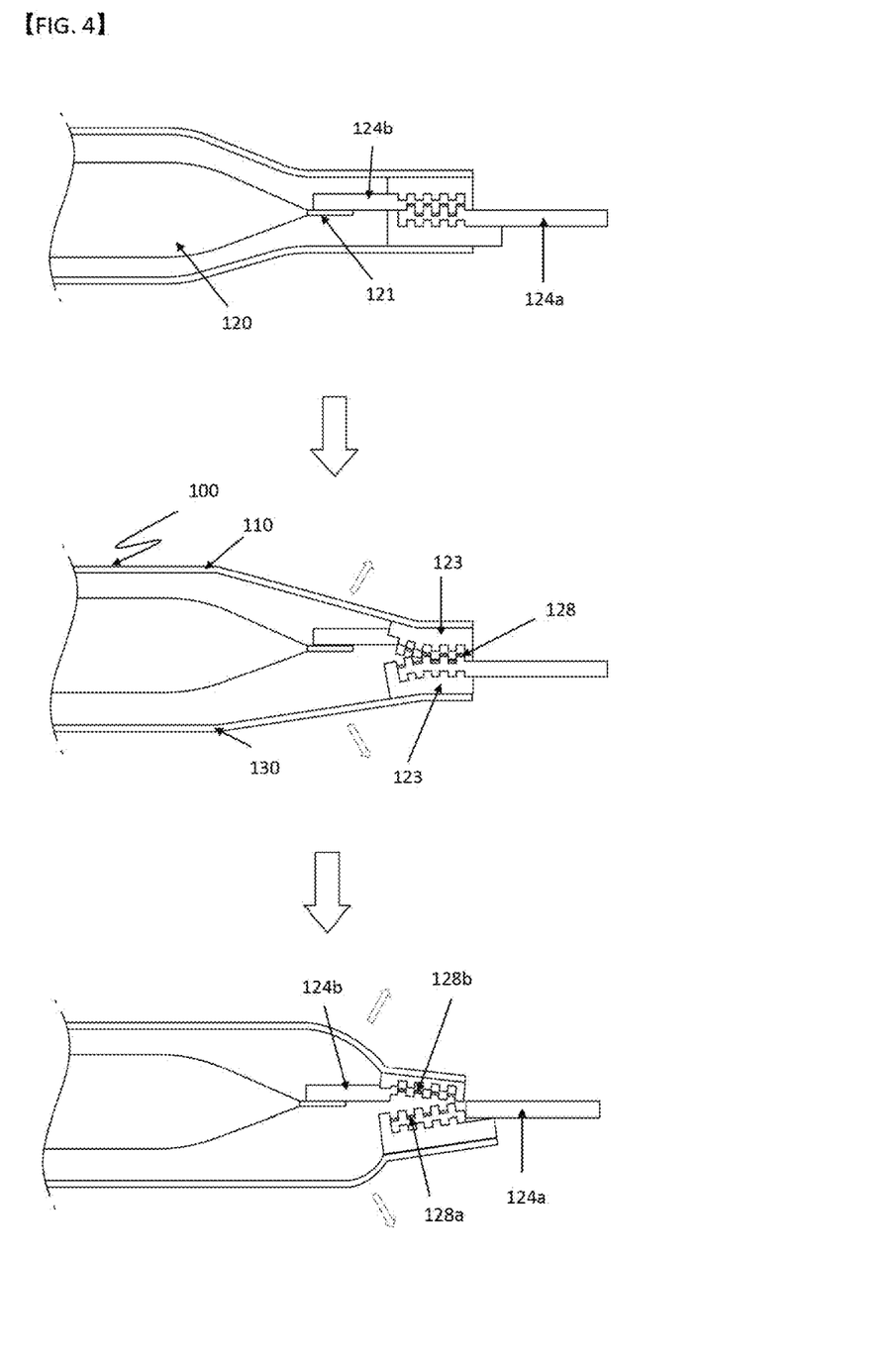
FIG. 4 is a sectional view showing the process in which a positive electrode tab is cut by the short circuit formation unit according to the embodiment of the present invention.

FIG. 4 is a sectional view showing the process in which a positive electrode tab is cut by the short circuit formation unit according to the embodiment of the present invention.

Figure 5:
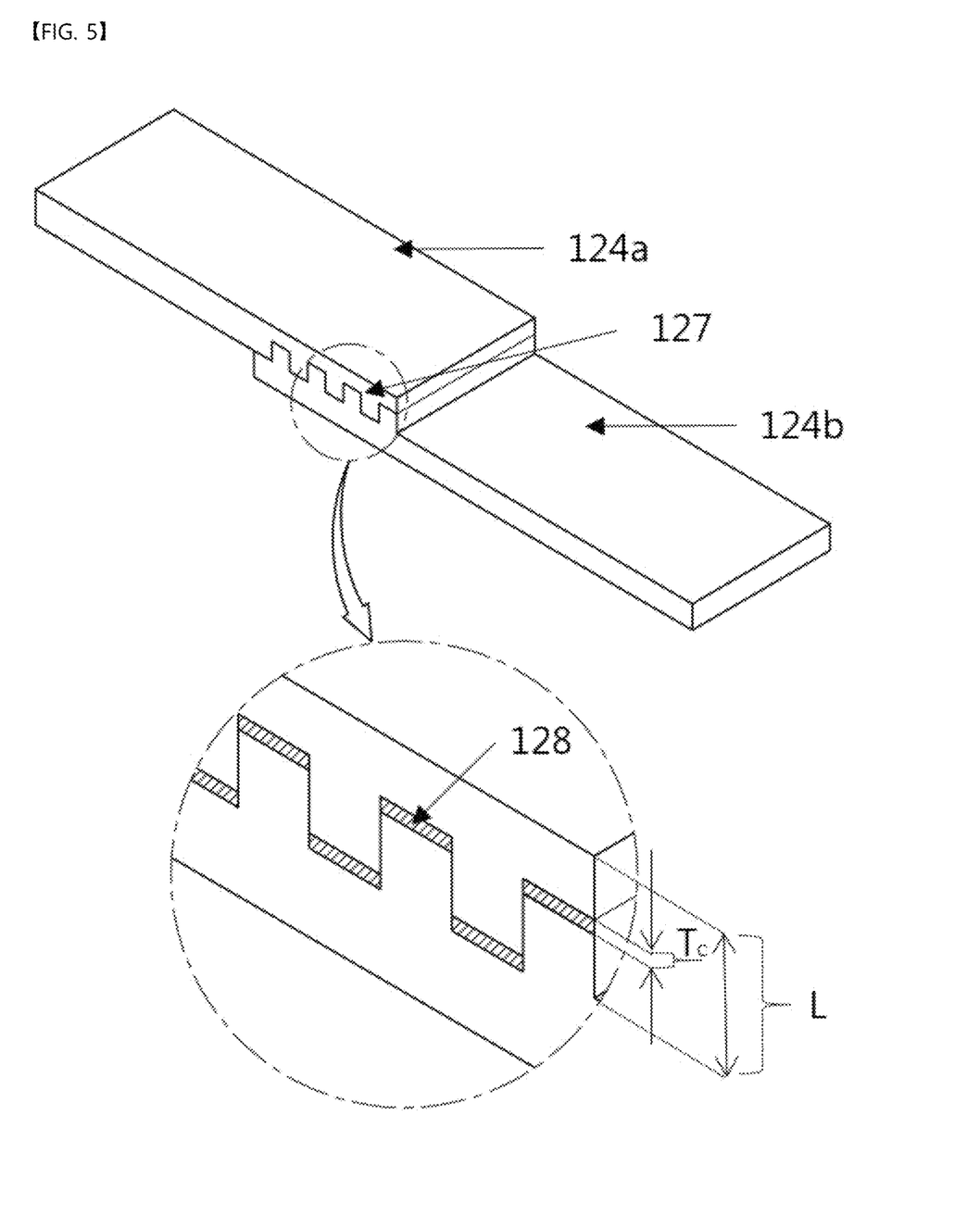
FIG. 5 is a perspective view showing the short circuit formation unit according to the embodiment of the present invention.

FIG. 5 is a perspective view showing the short circuit formation unit according to the embodiment of the present invention.

In addition, the electrode tab may be a positive electrode tab, a negative electrode tab, or both the positive electrode tab and the negative electrode tab.

In addition, the short circuit formation unit 127 may include a concave unit 124a and a convex unit 124b, which are coupled to each other.

The units constituting the short circuit formation unit 127 may be coupled to each other in various forms as long as the short circuit formation unit 127 is capable of physically cutting at least one selected from among the electrode tab, the electrode lead, and the connection between the electrode tab and the electrode lead when the volume of the pouch-shaped secondary battery is increased in the abnormal state of the pouch-shaped secondary battery. For example, at least one selected from among the electrode tab, the electrode lead, and the connection between the electrode tab and the electrode lead may include concave and convex units 124a, 124b, which are coupled to each other. When the volume of the pouch-shaped secondary battery is increased, the units constituting the short circuit formation unit 127 may be separated from each other to physically cut at least one selected from among the electrode tab, the electrode lead, and the connection between the electrode tab and the electrode lead, whereby it is possible to prevent current from flowing in the pouch-shaped secondary battery 100.

In addition, one surface of at least one selected from among the electrode tab, the electrode lead, and the connection between the electrode tab and the electrode lead may be disposed so as to be in contact with the pouch-shaped battery case 110, 130.

If the side surface of the short circuit formation unit 127 is not disposed so as to be in contact with a corresponding surface of the pouch-shaped secondary battery 100 when the pouch-shaped secondary battery 100 is in a normal state, the two or more units of the short circuit formation unit 127 may not be properly separated from each other when the volume of the pouch-shaped secondary battery 100 is increased in the abnormal state of the pouch-shaped secondary battery 100.

Figure 6:
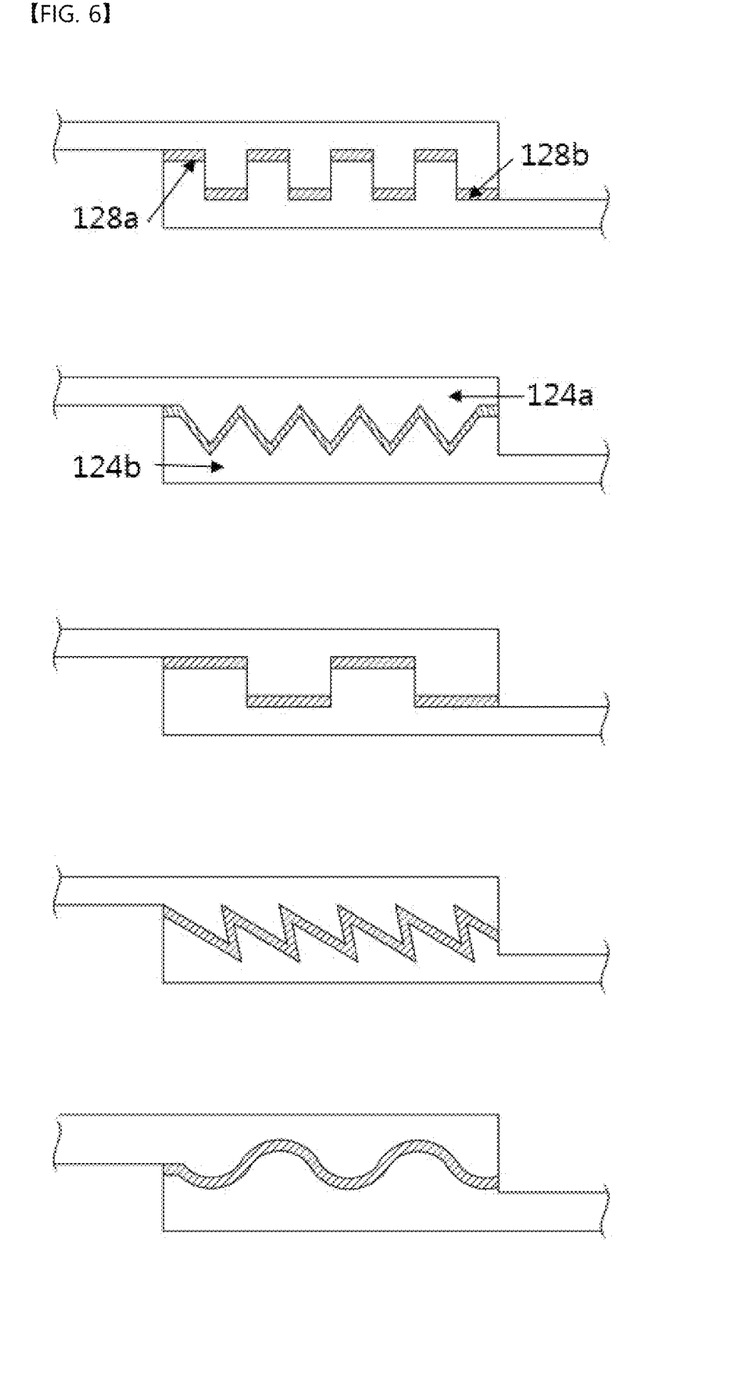
FIG. 6 is a view showing various sections of the short circuit formation unit according to the embodiment of the present invention.

In addition, an adhesive layer 128 may be further provided between the concave unit 124a and the convex unit 124b of the short circuit formation unit 127 and may have respective adhesive layers 128a, 128b of FIGS. 4 and 6.

In addition, the adhesive layer 128 may be a conductive adhesive layer.

In addition, the adhesive layer 128 may include metal particles made of gold, silver, copper, nickel, aluminum, or an alloy thereof. Alternatively, the adhesive layer may include particles, the surface of each of which is coated with a metal material, such as gold, silver, copper, nickel, aluminum, or an alloy thereof.

A thermoplastic, thermosetting, or photo curing resin, which exhibits high electrical insulation, may be used as a polymer resin part of the conductive adhesive layer. For example, any one selected from among a styrene-butadiene resin, a styrene resin, an epoxy resin, a urethane resin, an acrylic-based resin, a phenol resin, an amide-based resin, an acrylate-based resin, and a denatured resin thereof may be used. Two or more kinds of resins may be used in a mixed state as needed. Among the polymer resins, the thermoplastic resin may be an elastomer, which serves as a matrix to support the formation of a film. The thermoplastic resin may have a softening point of about 100 to 180° C. The thermoplastic resin may account for 20 to 80 volume % of the total volume % of the polymer resin. In addition, conductive particles may be used as the conductive adhesive layer.

Each of the conductive particles may have a diameter of 4 to 30 μm. Each of the conductive particles may be a metal particle, such as gold, silver, copper, nickel, aluminum, or an alloy thereof. Alternatively, each of the conductive particles may be a resin particle, such as polyethylene, polypropylene, polyester, polystyrene, polyvinyl alcohol, or a denatured resin thereof, the surface of which is coated with metal foil, such as gold, silver, copper, nickel, or aluminum. The adhesive layer 128 may be a thermally conductive adhesive layer. In addition, the thermally conductive adhesive layer may have a thickness of 50 to 200 μm.

The thermally conductive adhesive layer may be made of a mixture in which ceramic powder is dispersed in a polymer resin. The ceramic powder may account for 30 to 70 weight % of the total weight % of the mixture.

Preferably, the ceramic powder has about 50 weight % based on the total weight % of the mixture.

The ceramic powder may include at least one selected from among boron nitride (BN), aluminum oxide ($Al_2O_3$), silicon carbide (SiC), magnesium oxide (MgO), aluminum hydroxide ($Al(OH)_3$), and magnesium hydroxide ($Mg(OH)_2$). Preferably, the ceramic powder includes boron nitride (BN).

The thermosetting resin may include at least one selected from among an acrylic resin, an epoxy resin, an ethylene propylene diene monomer (EPDM) resin, a chlorinated polyethylene (CPE) resin, silicone, polyurethane, a urea resin, a melamine resin, a phenol resin, and an unsaturated polyester resin.

Preferably, the thermosetting resin includes an acrylic resin.

The thermally conductive adhesive layer may include an adhesive sheet, a copper sheet provided on the adhesive sheet, and a ceramic layer provided on the copper sheet, the ceramic layer being made of a mixture in which ceramic powder is dispersed in a polymer resin.

The adhesive sheet may include at least one selected from among an acrylic resin, an epoxy resin, an ethylene propylene diene monomer (EPDM) resin, a chlorinated polyethylene (CPE) resin, silicone, polyurethane, a urea resin, a melamine resin, a phenol resin, and an unsaturated polyester resin, which are polymer resins.

In addition, the adhesive sheet may be made of flake-shaped metal powder disposed in a polymer resin. The flake-shaped metal powder may include at least one selected from among copper (Cu), silver (Ag), silver-coated copper, and silver-coated nickel (Ni).

In addition, as shown in FIG. 6, each of the concave unit and the convex unit of the short circuit formation unit may be formed so as to have at least one selected from among a quadrangular section, a circular section, a semicircular section, a diamond-shaped section, an oblique section, a wave section, a zigzag section, a sawtooth section, and an arbitrarily shaped section.

In addition, the cutting layer, which contacts the electrode tab and the electrode lead, may be formed so as to have at least one selected from among a quadrangular section, a circular section, a semicircular section, a diamond-shaped section, an oblique section, a wave section, a zigzag section, a sawtooth section, and an arbitrarily shaped section. The cutting layer may have any of various shapes, as long as the cutting layer is capable of physically cutting at least one selected from among the electrode tab, the electrode lead, and the connection between the electrode tab and the electrode lead.

In addition, the outermost thickness of the cutting layer may be smaller than the thickness of the surface of the cutting layer that contacts the short circuit formation unit. In addition, the outermost section of the cutting layer may be triangular. However, the shape of the outermost section of the cutting layer is not particularly restricted, as long as the cutting layer is capable of physically cutting at least one selected from among the electrode tab, the electrode lead, and the connection between the electrode tab and the electrode lead.

In addition, the present invention may provide an electronic device including a pouch-shaped secondary battery having the short circuit formation unit formed therein.

In addition, the present invention may provide an electric vehicle including a pouch-shaped secondary battery having the short circuit formation unit formed therein.

In addition, the present invention may provide a hybrid electric vehicle including a pouch-shaped secondary battery having the short circuit formation unit formed therein.

In addition, the present invention may provide a power storage device including a pouch-shaped secondary battery having the short circuit formation unit formed therein.

In addition, an increase in the volume ($V_{short}$) of the pouch-shaped battery case for cutting the electrode tab and/or the electrode lead may satisfy the condition of $V_{short}$>L on the assumption that the length of one side surface of the short circuit formation unit is L.

Here, $V_{short}$ is defined as the state in which the length of one side surface of the short circuit formation unit is increased when a first lead and a second lead are separated from each other in the state in which the concave unit and the convex unit of the short circuit formation unit are normally coupled to each other.

Preferably, the condition of $V_{short}$>2L is satisfied.

In addition, an increase in the volume ($V_{short}$) of the pouch-shaped battery case for cutting the electrode tab and/or the electrode lead may satisfy the condition of $V_{short}$>Tc on the assumption that the length of a first short circuit formation unit adhesive layer and/or a second short circuit formation unit adhesive layer of the short circuit formation unit is Tc.

Here, $V_{short}$ is defined as the state in which the length of the first short circuit formation unit adhesive layer and/or the second short circuit formation unit adhesive layer of the short circuit formation unit increases in the state in which the concave unit and the convex unit of the short circuit formation unit are normally coupled to each other.

The short circuit formation unit is formed in the sealed region of the pouch-shaped secondary battery. An adhesive layer formed at one surface of an upper pouch-shaped battery case is formed at at least one selected from among the sealed region, the electrode tab, the electrode lead, and the connection between the electrode tab and the electrode lead. An adhesive layer formed at one surface of a lower pouch-shaped battery case is formed at at least one selected from among the sealed region, the electrode tab, the electrode lead, and the connection between the electrode tab and the electrode lead.

When the pressure in the secondary battery increases, force that deforms the pouch-shaped sheathing member is applied to the upper surface and the lower surface of the pouch-shaped sheathing member in opposite directions. At this time, the two or more units of the short circuit formation unit, which is formed in the sealed region of the pouch-shaped secondary battery and which is formed at the coupling portion between the electrode tab and the electrode lead, are separated from each other, whereby at least one selected from among the electrode tab, the electrode lead, and the connection between the electrode tab and the electrode lead may be cut.

The short circuit formation unit may be provided at each of the electrode tab, the electrode lead, and the connection between the electrode tab and the electrode. Alternatively, the short circuit formation unit may be provided at only one selected from among the electrode tab, the electrode lead, and the connection between the electrode tab and the electrode lead.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A pouch-shaped secondary battery, comprising:
a pouch-shaped battery case including an upper pouch part and a lower pouch part;
a battery cell in the pouch-shaped battery case;
an electrode tab in the pouch-shaped battery case and connected to the battery cell;
an electrode lead connected to the electrode tab and extended to an outside of the battery case,
wherein a lower surface of the electrode tab is overlapped with an upper surface of the electrode lead to define an overlap such that the lower surface of the electrode tab is electrically connected with the upper surface of the electrode lead; and
a conductive adhesive layer between the electrode tab and the electrode lead at the overlap,
wherein the lower surface and the upper surface at the overlap have a plurality of peaks and valleys to define cooperating patterned surfaces so that the lower surface is in contact with the upper surface at an entirety of the overlap,
wherein at least one of the electrode tab and the electrode lead is contacted with the pouch-shaped battery case so that the electrode tab and the electrode lead separate when the pouch-shaped battery case is deformed due to an increase in a volume of the pouch-shaped battery case, and
wherein the cooperating patterned surfaces of each of the upper surface and the lower surface includes one of a quadrangular section, a circular section, a semicircular section, a diamond-shaped section, an oblique section, a wave section, a zigzag section, and a sawtooth section.

2. The pouch-shaped secondary battery according to claim 1, wherein the adhesive layer comprises metal particles made of gold, silver, copper, nickel, aluminum, or an alloy thereof, or comprises particles, a surface of each of which is coated with a metal material including gold, silver, copper, nickel, aluminum, or an alloy thereof.

3. The pouch-shaped secondary battery according to claim 1, wherein the electrode tab includes at least one of a positive electrode tab and a negative electrode tab.

4. The pouch-shaped secondary battery according to claim 1, wherein an increase in the volume ($V_{short}$) of the pouch-shaped battery case to separate the electrode tab and the electrode lead satisfies a condition of $$V_{short} > L$$

wherein a thickness of the electrode tab is L.

5. The pouch-shaped secondary battery according to claim 1, wherein an increase in the volume ($V_{short}$) of the pouch-shaped battery case to separate the electrode tab and the electrode lead satisfies a condition of $$V_{short} > Tc$$

wherein a thickness of the adhesive layer is Tc.

6. A device comprising a pouch-shaped secondary battery according to claim 1.

7. The device according to claim 6, wherein the device is selected from a group consisting of an electronic device, an electric vehicle, a hybrid electric vehicle, and a power storage device.

8. The pouch-shaped secondary battery according to claim 1, wherein the electrode lead includes at least one of a positive electrode lead and a negative electrode lead.

* * * * *